Nov. 24, 1964  J. E. SKVARLA  3,158,741
URANIUM ORE DETECTION
Filed June 26, 1961  2 Sheets-Sheet 1

INVENTOR.
JOHN E. SKVARLA
BY
Donald C. Simpson
ATTORNEY

Nov. 24, 1964  J. E. SKVARLA  3,158,741
URANIUM ORE DETECTION
Filed June 26, 1961  2 Sheets-Sheet 2

INVENTOR.
JOHN E. SKVARLA
BY
Donald C. Simpson
ATTORNEY

United States Patent Office 3,158,741
Patented Nov. 24, 1964

1

3,158,741
URANIUM ORE DETECTION
John E. Skvarla, Tuxedo Park, N.Y., assignor to Union
Carbide Corporation, a corporation of New York
Filed June 26, 1961, Ser. No. 119,653
4 Claims. (Cl. 250—43.5)

This invention relates to the location of uranium ore deposits.

Uranium occurs naturally in isolated bodies within the host bodies. Thus, exploration procedures for locating uranium ore deposits are laborious and expensive. Common techniques include drilling a series of holes in a geologically favorable area; the drill cuttings are examined and the holes probed radiometrically.

As was indicated by A. B. Tanner, at the Second United Nations Conference on Peaceful Uses of Atomic Energy (Geneva, Switzerland, 1955, 3–E, P/1908, U.S.A.), drill cuttings and cores give information only about the rock column penetrated by the drill and a gamma-ray log of a drill hole gives information about a vertical cylinder of rock only a few feet in diameter. As a result uranium ore deposits of dimensions slightly smaller than the drill hole spacings may be undiscovered by a conventional drilling program. A balance must be struck between the economics of close drill hole spacings and the risk of permitting valuable deposits to go undetected.

It was suggested that the use of emanation methods may be employed for detecting uranium deposits, which method permits the spacing of drill holes at 200 to 300 foot intervals to provide results as effective as 50 to 75 foot spacings with conventional methods of evaluation.

While the foregoing method is an improvement over the more conventional methods of ore exploration, it would be desirable to increase drill hole spacings without increasing the risk of missing valuable ore deposits. Further, emanation methods require a substantial amount of time between the drilling and drill hole examination in order to permit the migration of radon into the drill holes. Further, the emanation method is highly effected by changes in atmospheric pressure, wind speed and direction, temperature, precipitation and snow cover.

It is an object of the present invention to provide a method for uranium exploration which avoids the limitation of the emanation method.

It is another object of the present invention to provide a method for uranium exploration wherein drill holes may be spaced up to half a mile apart.

It is a further object to provide a method for uranium exploration which can be employed in both vertical and horizontal prospecting methods.

A still further object is to provide an apparatus for uranium exploration which can be readily transported in a truck or carried by one man.

Other objects will be apparent from the description taken in combination with the accompanying drawings wherein.

2

Figure 6:
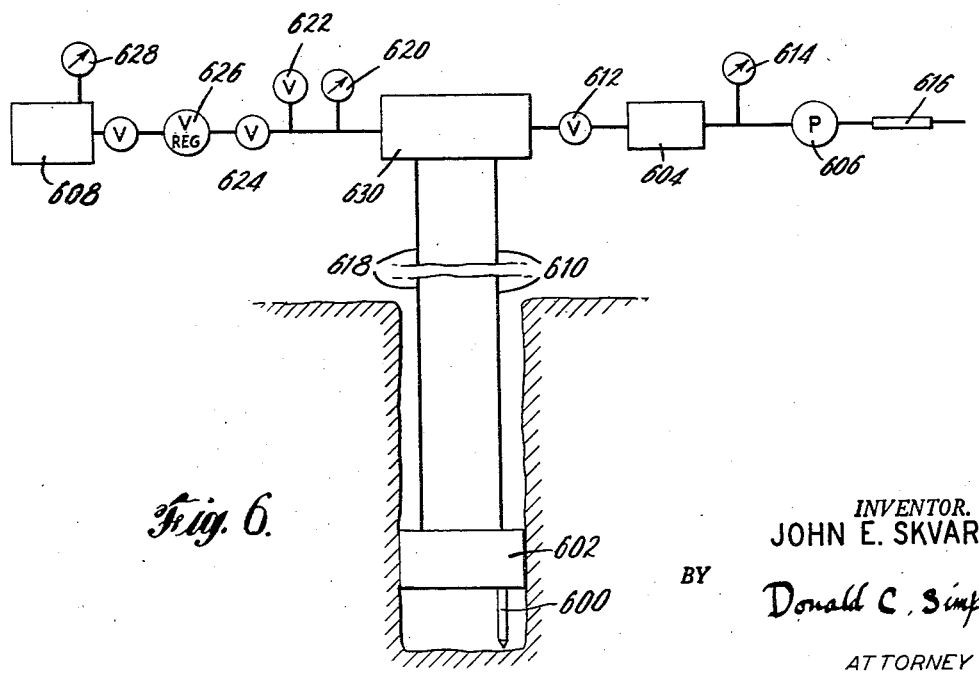

FIGURE 6 is a schematic drawing of the exploration assembly.

The objects of this invention are achieved by drilling a hole from the surface into the substrata region to be probed, evacuating gas present in the substrata region surrounding said hole through a radon adsorbing means without substantial dilution by atmospheric air, stopping suction of gases from the substrata region, and measuring the quantity of radon adsorbed by said adsorbent by radiometric means to provide a measure of the amount of uranium producing said radon by radioactive decay.

Radon is an alpha-particle emitter with a half life of 3.8 days. Thus, it is possible to measure the alpha activity of the adsorbed sample directly to determine the degree of favorability of a particular drill hole area. However, the quantitative measurement of alpha activity is difficult, particularly in the field. A more suitable technique is to measure the gamma ray intensity of the daughter products resulting from the decay of radon. This is suitably effected by sealing the adsorbed sample to permit the accumulation of the daughter products and measuring the maximum gamma intensity. This occurs about 135 minutes after sample collection. Thus gamma readings should be obtained about two hours after sampling. The gamma build-up is quite rapid when compared to its decay rate; thus a late reading is preferred to an early reading.

Figure 1:
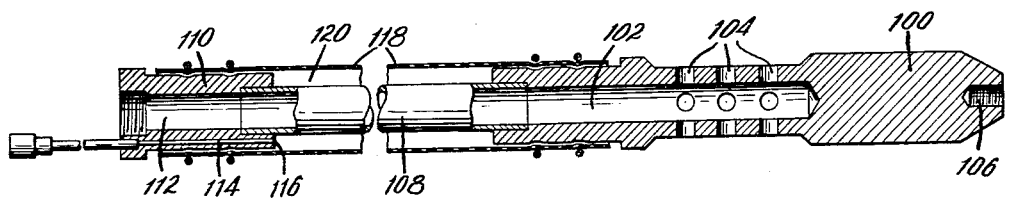
FIGURE 1 is a cross-section of a probe equipped with a single packer for exploration of small diameter bore holes.

A probe suitable for the exploration of areas surrounding small diameter bore holes is shown in FIGURE 1. Probe head 100, may be machined out of single piece of metal, as shown, for minimum size requirements or may be assembled from separate pieces of equipment. Probe head 100 contains a gas duct extending from the lateral surface through the end portion of the probe head; in FIGURE 1 it is shown as a longitudinal bore 102 having a plurality of radial gas inlet apertures 104. These apertures are suitably recessed to prevent mud contamination and plugging.

The leading portion of the probe head 100 is shown with a female thread 106 for attachment of a replaceable, weighted point; the point is useful for penetration through clay zones which tend to plug bore holes. Additionally, the point will take the brunt of injury during probe insertion; it is easily replaced without requiring machining of an entire probe head.

Longitudinal bore 102 is connected to conduit 108 which, in turn, is connected to probe end piece 110 through passage 112 to provide a continuous passage from radial gas inlet apertures 104 through the entire probe of FIGURE 1. Probe end piece 110 is provided with an additional fluid conduit 114 having an aperture 116 exterior to both conduit 108 and passage 112. While conduit 114 is shown as parallel and exterior to passage 112, it may be suitably run through conduit 112 provided aperture 116 is as previously described.

Conduit 108 is surrounded by an inflatable tube 118 which is attached to probe head 100 between gas inlet apertures 104 and the end portion of the probe head, and attached to probe end piece 110 between aperture 116 and the end portion of the probe end piece. Thus, inflatable tube 118, the outer surface of passage 108, and the opposing surfaces of probe head 100 and probe end piece 110 define an annular chamber 120 to which free access may be had only through aperture 116. The connections with inflatable tube 118 and with passage 108 are such as to prevent substantial flow of fluids into or out of chamber 120 except through aperture 116. Thus, upon passing a suitable fluid such as air under pressure into chamber 120, inflatable tube 118 will be caused to inflate and assume the shape of any surrounding drill hole, within the limits of elasticity of the inflatable tube, and seal the probe head portion of such surrounding drill hole from the probe end portion of such drill hole. Pure latex rubber has been found to be suitable material for inflatable tube 118.

Figure 2:
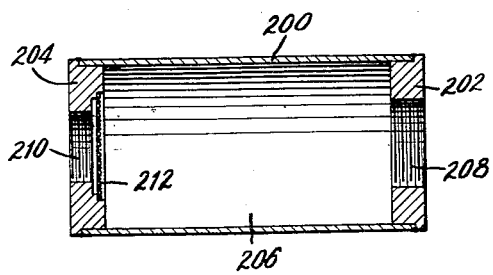
FIGURE 2 is a cross-section of a suitable radon adsorber.

FIGURE 2 is an illustration of a suitable sample collector. In FIGURE 2, the collector is shown as comprising a hollow cylinder 200 and end pieces 202 and 204 to define a chamber 206. End piece 202 contains a gas inlet 208 adapted to be connected, by conduit means, to a suitable probe such as that shown in FIGURE 1. The connection would be to passage 112 of FIGURE 1. End piece 204 contains a gas outlet 210 adapted to be connected, by conduit means, to a suitable source of vacuum. Interposed between chamber 206 and gas outlet 210 is a screen 212. Chamber 210 is shown empty. In practice, a suitable radon adsorbing material such as activated charcoal is contained therein. In such instances, screen 212 is suitably of the order of 40 mesh to retain the adsorbing material in chamber 206 under substantial suction pressure.

Figure 3:
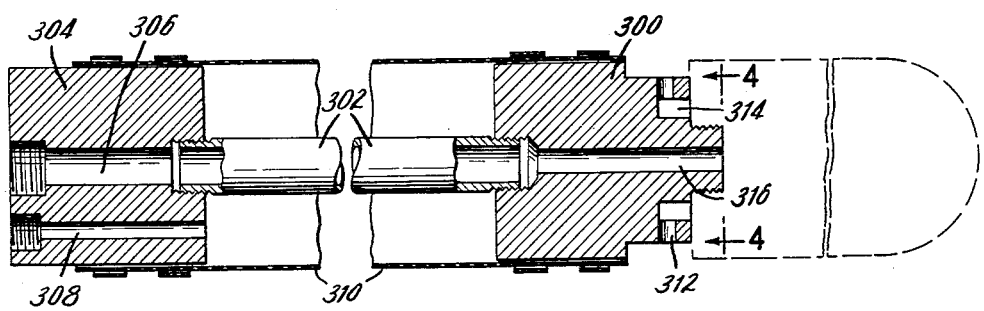
FIGURE 3 is a cross-section of a probe with single packer and filter for exploration of large diameter bore holes.

FIGURE 3 is a modified probe particularly suitable for exploration of large diameter drill holes. With the exception of probe head 300, the probe is substantially the same as that of FIGURE 1 and comprises conduit 302, probe end piece 304 having passages 306 and 308, and inflatable tube 310 in substantially the same relation as described for FIGURE 1.

Figure 4:
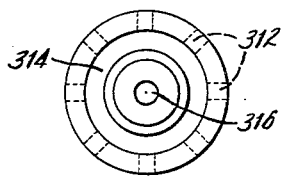
FIGURE 4 is a section of the probe of FIGURE 3 at 4—4.

The significant difference is found in probe head 300. Instead of connecting to a central bore, gas inlet apertures 312 are connected to an annular passage 314 opening in the leading end of probe head 300. Annular passage 314 is shown as concentric with passage 316. The leading end of probe head 300 is adapted to be equipped with a suitable sand filter, so that gases passing through inlet apertures 312 into annular passage 314 will pass through such a sand filter before passing into passage 316. FIGURE 4 is a cross-section of probe head 300 through 4—4 (with sand filter removed).

In FIGURE 1, inflatable tube 118 is shown attached to probe head 100 and end piece 110 by clamps exerting pressure against the tube coincidentally with grooves in the respective pieces. In FIGURE 3, inflatable tube 310 is shown attached by comparatively wide band hose clamps without corresponding groove, in the probe pieces.

Figure 5:
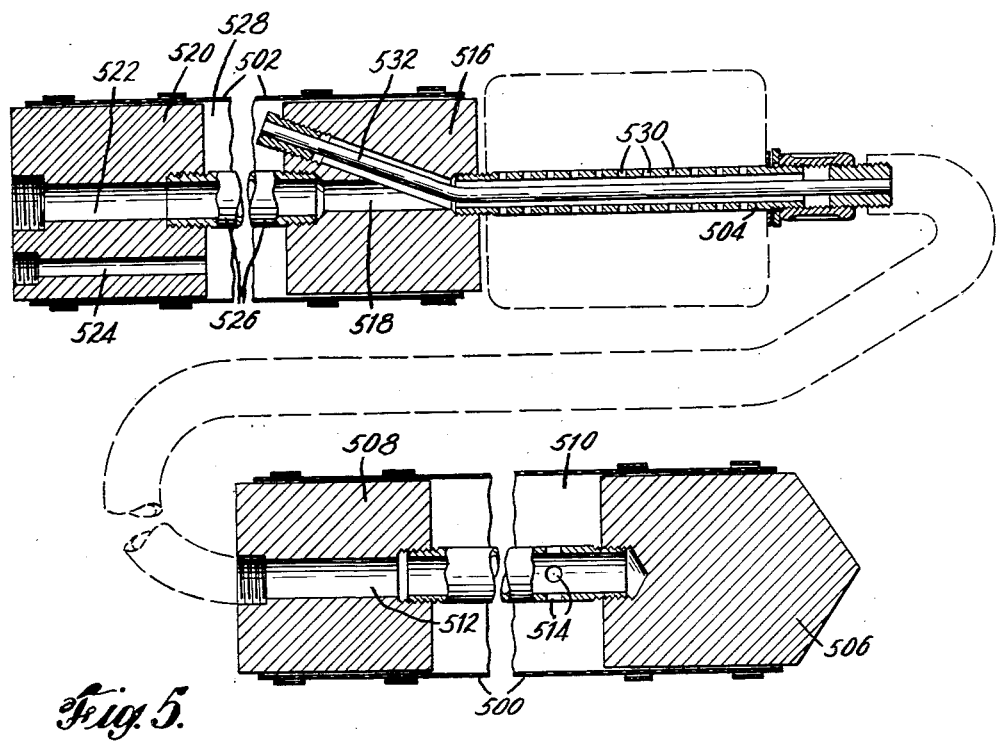
FIGURE 5 is a cross-section of a probe equipped with double packers and filter for exploration of large diameter bore holes.

FIGURE 5 illustrates a further modification of the probe which is particularly adapted for exploration of horizontal drill holes from a station within mine workings. The probe of FIGURE 5 comprises a first inflatable tube portion 500, a second inflatable tube portion 502, and an interposed gas inlet portion 504. First inflatable tube portion 500 is shown as comprising a leading section 506 and a following section 508 which, together with inflatable tube 500, define a chamber 510. A conduit is provided to conduct inflating fluid into chamber 510; in FIGURE 5 this is shown as passage 512 discharging into chamber 510 through ports 514. Second inflatable tube portion 502 comprises a leading section 516 containing passage 518, a following section 520 containing passages 522 and 524, and a conduit 526 connecting passages 518 and 522 which, together with inflatable tube 502, define annular chamber 528. Passage 524 provides for the passage of inflating fluid into and out of chamber 528. Interposed gas inlet portion 504 may be any suitable conduit means having gas inlet apertures 530 distributed around the peripheral surface. It is suitably surrounded by a sand filter.

Inflating fluid may be introduced into chamber 510 by any suitable means. The illustrated probe provides a conduit 532 opening at one end into chamber 528, passing through the wall of passage 518, running concentrically through gas inlet portion 504, and opening at the other end through the blind end of gas inlet portion 504. The latter opening is then connected by any suitable conduit to passage 512 to provide a continuous passage of inflating fluid from passage 524 through chamber 528 into chamber 510.

The assembled apparatus is shown schematically in FIGURE 6. In FIGURE 6, the basic elements of this novel combination are probe 600 having inflatable tube 602 (shown inflated), radon collector 604, vacuum source 606, and pressurized inflating fluid source 608. In practice, additional pieces of equipment are required. As shown in FIGURE 6, probe 600 is connected through suction hose 610 to a valve 612, radon collector 604, vacuum gauge 614, vacuum pump 606, and flow meter 616. Inflatable tube 602 is connected through compressed air line 618 to pressure gauge 620, vent valve 622, valve 624, air pressure regulator 626, and compressed air tank 608 having presusre gauge 628. Suction hose 610 and compressed air line 618 may be wound together on hose reel 630. It may be found desirable in some instances to have the compressed air line and suction hose arranged as two concentric hoses rather than two separate lines as shown in FIGURE 6.

The practice of the present invention will be described for the apparatus of FIGURE 6 wherein probe 600 is of the type shown in FIGURE 1. The description would apply equally well with a probe of the type of FIGURE 3. This invention will be described for surveying vertical drill holes having a diameter of 1½ to 3 inches and a maximum depth of 160 feet from the turface to the top of ore bearing sands. Appropriate modifications may be made for different geological conditions.

Probe 600 may suitably comprise a brass probe head 100 about 5½ inches long with a maximum cross-sectional dimension of about 1¼ inches. Probe end piece 110 may also be brass, and should have no cross-sectional dimension greater than the corresponding dimension in probe head 100. Conduit 108 is suitably ¾ inch steel pipe. Inflatable tube 118 is suitably a 2-foot length of pure latex rubber tubing, 1-inch in inside diameter with a ⅛-inch wall thickness.

Conduit 114 is connected to a 5 cubic foot, 125 p.s.i.g. working pressure compressed air tank 608 filled with air at a pressure of about 70 to 100 p.s.i.g. through 200 feet of 3/16-inch O.D. vinyl plastic tubing (compressed air line 618). Passage 112 is connected to a vacuum pump system 606 capable of providing a static pump suction pressure of the order of 16 in. Hg or better and flow rates of the order of 10 cubic feet per minute or better with a pump suction of 12 in. Hg through about 220 feet of steel reinforced, vinyl tubing ¾-inch I.D. by 1¼-inch O.D. (suction hose 610).

Probe 600 is inserted into the test drill hole, and lowered to the position selected. Any suitable metering means may be employed to determine the depth of the probe in the test hole. Compressed air is then passed from compressed air tank 608 through compressed air line 618 until inflatable tube 602 is inflated to conform to the surrounding walls of the test hole. Thus, the lower portion of the test hole is sealed off from the portion of the test hole above the probe.

Above 60 cc. of activated cocoanut charcoal, activated carbon, or other radon adsorbing material is transferred to radon adsorber 604. The activated charcoal is suitably prepared for removal of residual gases. Vacuum is then applied to draw gases from the selected formation through the adsorber into the test hole, through probe 600 and through radon adsorber 604, to collect any radon in the gas stream on the activated charcoal.

The evacuation may be for any period deemed suitable. At the conclusion of the evacuation, the charcoal is transferred to a storage bottle for subsequent radiometric analysis.

As was stated previously, it is theoretically possible to measure the alpha activity of an adsorbed sample. As a practical matter, however, it is easier and more accurate to measure the gamma ray intensity of the radon daughter products. The samples should be counted no sooner than about 2 hours after collection since the gamma build-up is quite rapid when compared to its decay rate.

The degree of favorability of a particular drill hole area is determined in terms of the radon content of the surrounding formation relative to that of other drill holes. This may be suitably effected by measuring the charcoal gamma activity after adsorption in terms of an equivalent volume of pulped uranium ore. The samples are measured for gross gamma activity using a suitable radiation detector such as a well type scintillation detector. A thin wall, glass Geiger-Mueller detector with a laboratory scaler and a thin metal wall Geiger-Mueller detector with a portable gamma survey meter may also be used, the detectors being arranged as dip counters to provide a 2 pi geometry. The data are interpreted in terms of both the absolute amount of radon detected and the activity of the samples relative to each other. By mapping the radon values within a field, the location of ore deposits can be ascertained.

To evaluate the drill hole favorability, only simple manipulative steps are required. The charcoal sample is divided into aliquot samples. An equal volume sample of uranium ore of known assay is also prepared. The background gamma count is determined, the uranium ore standard count is determined, the aliquot samples are determined, the uranium ore standard count is again determined, and the background gamma count is again determined. In the calculation of the favorability factor which follows "net counts" in all cases is obtained by subtracting the average background gamma activity in counts per minute from the average gross gamma activity in counts per minute of the sample under consideration.

The charcoal activity may be defined as:

$$C.A. = \frac{S.C. \times D.C.F.}{C.V. \times U.S.A.}$$

where: C.A.=charcoal activity; S.C.=net average aliquot sample count, counts per minute; C.V.=charcoal volume, cubic centimeters; D.C.F.=decay correction factor; U.S.A.=uranium standard activity, counts/minute/gram $U_3O_8$. The decay correction value compensates for decay of daughter products by extrapolating to activity at zero decay time. The percent decay is numerically equal to the time elapsed since sampling minus two. Thus, the correction factor is 100 percent plus the percent decay. For example, where the drill hole is sampled at 10:00 a.m. and the charcoal analyzed at 4:00 p.m., the percent decay is six minus two, or 4 percent, and the decay correction factor is 1.04. The uranium standard activity is the net average counts per minute of the pulped uranium ore divided by the value of $U_3O_8$ in the ore (weight of ore, gram, X assay).

The drill hole favorability factor is determined by dividing the charcoal activity by the net volume of air pumped through the adsorber.

The foregoing specific description was for the exploration of drill holes of specific depth and diameter. If deeper holes are explored, longer hoses and more powerful pumps will be required. Similarly, for larger diameter holes, a larger diameter inflatable tube is required if over expansion is to be avoided; a larger probe of the type shown in FIGURE 3 is then preferred.

Following the practice of this invention, the Uravan area of the Colorado Plateau was explored. Uranium deposits in this locality are covered by from about 50 feet to about 500 feet of overburden. At the base of the overburden covering the ore is a clay layer. A layer of impervious clay is also under the ore. As a result, radon tends to flow only horizontally to the drill hole, and the gas sampled is only that which is confined between the horizontal layers of clay (presupposing that the probe is dropped into the drill hole to a level such that the inflatable tube seals against the upper layer of clay). The area had been previously drilled to determine the extent of the uranium reserve; thus the test results served as a basis for detection of uranium ore. In a particular test the nearest distance of known ore from the drill hole was 350 feet. Therefore, the presence of the uranium ore body was detected easily through 350 feet of barren formation. It was found that the proximity of the uranium deposit to the sample point could be deduced from the amount of radon collected.

The present invention was also utilized to explore the Maybell area of the Colorado Plateau. Uranium ore in this area occurs in loose sandstone with no impervious clay layer over the ore. Because of the absence of an impervious clay layer, radon gas can be induced to flow vertically, as well as horizontally, to the surface of the ground rather than flow only horizontally to a drill hole. The distribution of radon was sufficiently broad to allow testing on half-mile centers. Holes were drilled every half-mile where access to properties was available. These holes were drilled to 20 feet, a depth empirically derived as optimum for radon detection over and around the known ore bodies. A hole diameter of 3½ inches was used. Drilling was done with air removal of cuttings. The results of these tests in counts per minute per cubic foot of air were plotted on a map of appropriate scale, assigning an area of influence of one-half mile radius to each hole. Count rates of thirty gamma counts per minute per cubic foot of sample air represented the lower limit of favorability. An individually favorable hole was blocked out on half-mile centers, with offsets down to one-fourth mile centers to more accurately delineate the anomaly. Where a grouping of three or more favorable areas occurred contiguously, the entire area was considered anomalous and worthy of further exploratory work.

Approximately 20,000 tons of ore averaging 0.10% $U_3O_8$ were discovered using the radon detection technique. In addition, various areas considered barren as a result of conventional grid drilling and normal radiometric detection methods were found to contain uranium when re-surveyed by the new technique of radon collection. Data obtained in exploring other areas were sufficiently favorable to warrant test drilling in these areas.

The foregoing techniques have been described generally for exploration of vertical drill holes. However, they are not so limited, and are equally applicable for exploration of horizontal drill holes drilled through the ore horizon on a radial pattern from a station within mine workings. The basic apparatus may be suitably modified as shown in FIGURE 5. With such modified apparatus, both inflatable tubes may be inflated to permit sampling at given points in the horizontal drill hole between inflatable tubes, thereby indicating the location of ore deposits along the drill hole. Horizontal drill holes run about 100 feet in depth and have diameters of the order of 1⅞ inches. The equipment will, of course, have to be modified to correspond to the dimensions of the holes being investigated. The ore detection method of the present invention will both indicate the drill hole nearest an ore body and indicate the position of the ore along the length of the hole. The probe for exploration of horizontal drill holes is adapted to be pushed (or suction pulled) into drill holes rather than dropped in under the force of gravity. Additionally, since compressed air of the order of 125 p.s.i.g. is available at mine workings, the probe pumps are suitably rotary vacuum pumps driven by an air motor. The compressed air supply may be used for inflating the sealing tubes.

In practice, the probe is inserted, 10-foot sections, are isolated by inflating the two inflatable tubes, the isolated section is then evacuated, the inflatable tubes are deflated, the probe partially withdrawn, a new ten-foot section is isolated, and the process repeated until the drill hole has been surveyed to the desired extent.

Following the practices of the present invention, vertical or horizontal drill holes may be explored for uranium deposits, the distance between drill holes greatly reduced, exploration costs minimized, and many new deposits located in what were believed to be unmineralized areas.

What is claimed is:
1. A method for the location of uranium-ore deposits comprising drilling a hole into the substrata region to be probed, evacuating a quantity of gas from the substrata region while preventing dilution of such gas by atmospheric air by sealing the hole at a point between the region being evacuated and the open end of the hole, passing the collected gas through a radon adsorber to collect radon present in the gas, and thereafter measuring the quantity of radon adsorbed by radiometric means for determining the gamma ray activity to provide a measure of the amount of uranium producing the radon.

2. A method in accordance with claim 1 wherein the quantity of radon adsorbed is measured at least 2 hours after sampling by determining the maximum gamma intnesity of the daughter products resulting from decay of said radon.

3. A uranium exploration device for probing drill holes comprising, in combination, a probe member containing a passage having an inlet and an outlet; a radon adsorber adapted to adsorb radon from a gas stream passed therethrough; vacuum means; conduit means connecting the outlet of the passage in said probe member, said radon adsorber, and said vacuum means in a series connection wherein gases drawn by said vacuum means through the inlet of the passage in said probe member are caused to pass through said radon adsorber; inflatable sealing means positioned along the probe member-conduit means axis at a point above the probe member inlet, in surrounding relation to a portion thereof, and adapted to seal against the walls of the drill hole being probed to prevent the flow of fluid from the inlet of the drill hole being probed into the inlet of the passage in said probe member; a source of pressurized inflating fluid; and conduit means connecting said inflating fluid and said sealing means adapted to conduct said inflating fluid source to said sealing means to effect the inflation thereof.

4. A uranium-exploration device for probing drill holes comprising an elongated-probe member having a longitudinal passage therethrough with an inlet and an outlet at opposite ends of the passage, the outlet adapted to receive a conduit whereby gases drawn into the passage through the inlet may be passed to the conduit to a gas-measuring device, a probe-head member attached to the inlet end of said elongated probe, said head member having a cavity therein, filter means in said cavity, a passage providing communication between the inlet of the longitudinal passage and the cavity through the filter means, a plurality of radial apertures located in the outer walls of said head member, an annular passage in said head member communicting at one end with each of said radial apertures and communicating at the other end with the cavity in the head member whereby gases may be drawn into the radial apertures and through the annular passage into the cavity, through the filter into the longitudinal passage and thence out the conduit.

References Cited in the file of this patent
UNITED STATES PATENTS

| | | |
|---|---|---|
| 2,747,100 | Wyllie et al. | May 22, 1956 |
| 2,878,391 | Campbell | Mar. 17, 1959 |
| 2,892,091 | Sawle | June 23, 1959 |
| 2,933,923 | Milochik | Apr. 26, 1960 |
| 2,965,759 | Eberline | Dec. 20, 1960 |
| 2,993,122 | Mero | July 18, 1961 |
| 3,028,493 | Takahashi | Apr. 3, 1962 |
| 3,056,886 | Glaude et al. | Oct. 2, 1962 |